(No Model.)

W. R. PARK.
Mechanism for Operating Valves.

No. 239,336. Patented March 29, 1881.

UNITED STATES PATENT OFFICE.

WILLIAM R. PARK, OF BOSTON, MASSACHUSETTS, ASSIGNOR TO THE HANCOCK INSPIRATOR COMPANY, OF SAME PLACE.

MECHANISM FOR OPERATING VALVES.

SPECIFICATION forming part of Letters Patent No. 239,336, dated March 29, 1881.

Application filed August 25, 1880. (No model.)

*To all whom it may concern:*

Be it known that I, WILLIAM R. PARK, of Boston, in the county of Suffolk and State of Massachusetts, have invented a new and useful Improvement in Mechanism for Operating Valves, of which the following is a specification.

My invention relates to a means for operating a valve or valves designed to be used more particularly in connection with an inspirator or apparatus for lifting and forcing water or other fluids.

The invention consists in the combination, with a valve-stem, of a nut upon which is fitted a sleeve or collar surrounded by an annulus which forms a part of the actuating-lever. To the outer end of the valve-stem is attached an arm which is slotted at its opposite end, and in the slot is secured a pin or cylindrical bar parallel to the valve-stem and fitted to move freely in the direction of its length in an opening in the lever-annulus. On the valve-stem is a screw-thread, which works in a corresponding female screw in the valve-stem nut, so that by operating the lever motion is imparted to the valve-stem to operate the valves.

Figure 1:
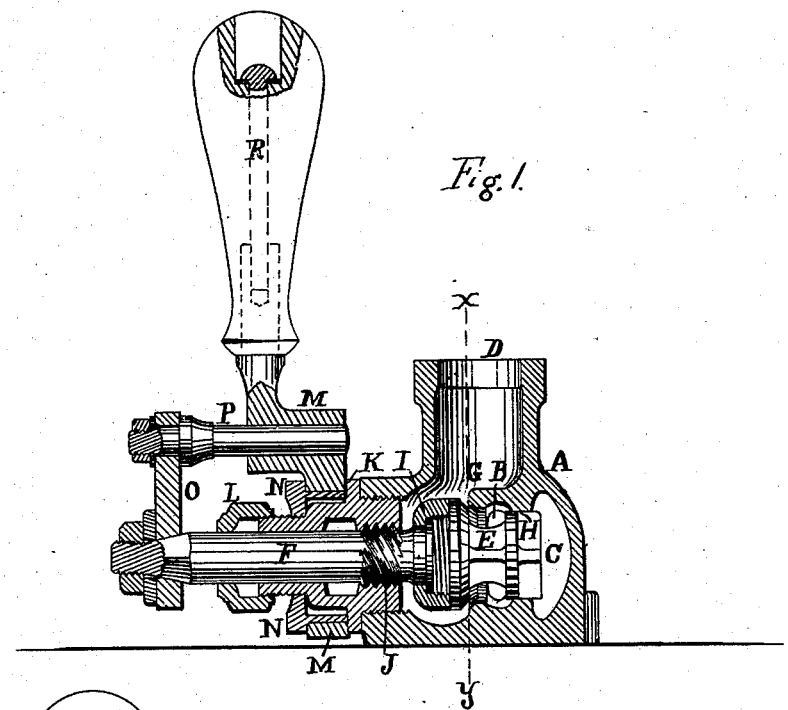
Figure 3:
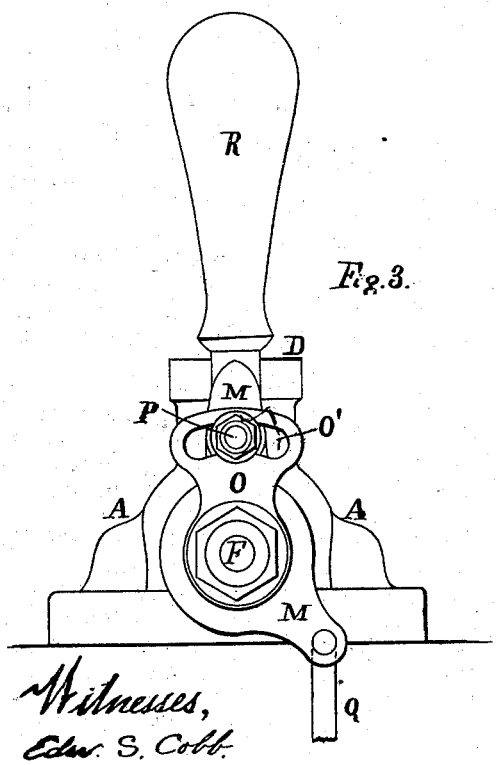
Figure 2:
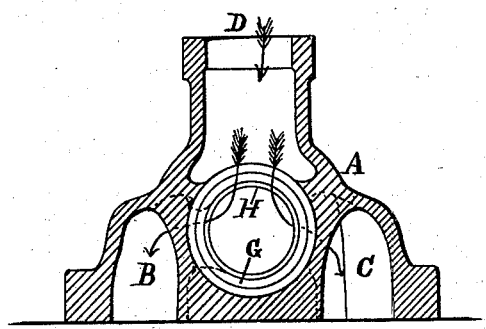

Referring to the drawings, Figure 1 is a horizontal vertical section of my invention, shown in connection with a valve. Fig. 2 is a transverse vertical section of a valve. Fig. 3 is a front elevation of my invention.

My invention is shown as connected to a valve or valves to be used in connection with an apparatus for lifting and forcing liquids where it is desirable to operate one valve in advance of the other or others.

G and H are two valves connected together by a stem and inclosed in a shell or valve-casing, A, and suitably connected to the valve-stem F.

B is a steam-passage connecting with the steam-supply passage D, leading from the boiler. C is also a steam-passage connecting with the supply-passage D. The passage B is designed to lead to a lifting apparatus, and C to a forcing apparatus.

K is a valve-stem nut attached to the casing A, and having a packing-nut, L, at its opposite end.

On the valve-stem F is formed a screw-thread, J, which works in the nut K.

N is a sleeve or collar surrounding a portion of the nut K, and secured to the same by a nut forming a part of the said sleeve.

M is an annulus surrounding the sleeve N and constituting a part of the actuating-lever, and rotating freely on the said sleeve, which forms a bearing for said lever.

O is an arm composed of a flat piece of metal attached at one end to the outer end of the valve-stem F. In the upper or opposite end of arm O is a curved slot, O', in which is fastened, by a nut, a pin or cylindrical bar, P, passing through a hole in the lever M, and is fitted so as to move freely in the same longitudinally.

To the lower portion of the lever-annulus M is attached a rod, Q, which is designed to be connected with an overflow or other valve below.

By means of the curved slot in the arm O the pin P can be so set as to adjust the relative time of opening and closing the upper valves and those actuated by the rod Q.

By having the bearing of the lever upon the sleeve which encircles the valve-stem nut, and connecting the lever with the arm which is attached to the end of the valve-stem by the movable pin, as described, instead of operating the valve-stem directly by the lever, the valve-stem is relieved of the strain due to the longitudinal movement occasioned by the screw.

What I claim as my invention is—

1. The combination of the valve-stem F, provided with the screw-thread J, the nut K, sleeve N, and lever M, connected to the valve-stem by a pin, P, and arm O, substantially as and for the purpose set forth.

2. The combination of the lever M, the adjustable pin P, the slotted arm O, and the valve-stem F, substantially as specified.

3. The combination, with a valve-stem and nut operating one or more valves, of an actuating-lever, and an adjustable pin and a sleeve, substantially as set forth.

In testimony whereof I have signed my name to this specification in the presence of two subscribing witnesses.

WM. R. PARK.

Witnesses:
 JOS. H. ADAMS,
 EDW. S. COBB.